(12) United States Patent
Chang et al.

(10) Patent No.: US 7,136,846 B2
(45) Date of Patent: Nov. 14, 2006

(54) WIRELESS INFORMATION RETRIEVAL

(75) Inventors: Jane Wen Chang, Cambridge, MA (US); Raymond Lau, Charlestown, MA (US); John Schweikert, Boston, MA (US)

(73) Assignee: 2005 Keel Company, Inc., Armonk, NY (US)

( * ) Notice: Subject to any disclaimer, the term of this patent is extended or adjusted under 35 U.S.C. 154(b) by 506 days.

(21) Appl. No.: 09/827,500

(22) Filed: Apr. 6, 2001

(65) Prior Publication Data

US 2003/0037043 A1 Feb. 20, 2003

(51) Int. Cl.
G06F 17/30 (2006.01)

(52) U.S. Cl. .................. 707/3; 707/2; 707/10; 707/102

(58) Field of Classification Search .............. 707/3, 707/4, 5, 10, 100, 102, 104, 9, 1, 2, 104.1, 707/6; 709/200, 203, 206, 217, 219, 231, 709/246, 228; 704/235, 260, 1, 4, 7, 8, 9, 704/10, 249, 254, 257, 275, 277
See application file for complete search history.

(56) References Cited

U.S. PATENT DOCUMENTS

| | | | |
|---|---|---|---|
| 4,724,523 A | 2/1988 | Kucera | |
| 4,984,178 A | 1/1991 | Hemphill et al. | |
| 5,060,155 A | 10/1991 | van Zuijlen | |
| 5,111,398 A | 5/1992 | Nunberg et al. | |
| 5,146,406 A | 9/1992 | Jensen | |
| 5,251,129 A | 10/1993 | Jacobs et al. | |
| 5,325,298 A | 6/1994 | Gallant | |
| 5,369,577 A | 11/1994 | Kadashevich et al. | |
| 5,418,717 A | 5/1995 | Su et al. | |
| 5,475,588 A | 12/1995 | Schabes et al. | |
| 5,577,241 A | 11/1996 | Spencer | |
| 5,610,812 A | 3/1997 | Schabes et al. | |
| 5,627,914 A | 5/1997 | Pagallo | |
| 5,634,121 A | 5/1997 | Tracz et al. | |
| 5,649,215 A | 7/1997 | Itoh | |
| 5,680,628 A | 10/1997 | Carus | |
| 5,708,829 A | 1/1998 | Kadashevich | |
| 5,737,621 A | 4/1998 | Kaplan et al. | |
| 5,737,734 A | 4/1998 | Schultz | |
| 5,748,973 A | 5/1998 | Palmer et al. | |
| 5,799,268 A | 8/1998 | Boguraev | |
| 5,822,731 A | 10/1998 | Schultz | |
| 5,826,076 A | 10/1998 | Bradley et al. | |
| 5,864,863 A | 1/1999 | Burrows | |
| 5,884,302 A | 3/1999 | Ho | |
| 5,890,147 A | 3/1999 | Peltonen et al. | |
| 5,911,756 A | 6/1999 | Debry | |
| 5,913,215 A | 6/1999 | Rubinstein et al. | |

(Continued)

OTHER PUBLICATIONS

Grammar-like Functional Rules for Representing Query Otimization Alternative, 1988 ACM, pp. 18-27.*

(Continued)

*Primary Examiner*—Shahid Alam
*Assistant Examiner*—Fred Ehichioya
(74) *Attorney, Agent, or Firm*—Gates & Cooper LLP (57) ABSTRACT

A method of accessing information from a wireless device including processing a query and a wireless identifier received from the wireless device, searching a collection of data for a set of results matching the query, selectively reducing the set of results to generate a subset of results and outputting the subset of results on the wireless device according to a style sheet.

23 Claims, 6 Drawing Sheets

U.S. PATENT DOCUMENTS

| | | | |
|---|---|---|---|
| 5,933,822 A | 8/1999 | Braden-Harder et al. | |
| 5,950,184 A | 9/1999 | Karttunen | |
| 5,963,894 A | 10/1999 | Richardson et al. | |
| 5,970,449 A * | 10/1999 | Alleva et al. | 704/235 |
| 5,983,216 A | 11/1999 | Kirsch | |
| 5,991,713 A | 11/1999 | Unger et al. | |
| 5,991,751 A | 11/1999 | Rivette et al. | |
| 5,991,756 A | 11/1999 | Wu | |
| 6,009,422 A | 12/1999 | Ciccarelli | |
| 6,012,053 A | 1/2000 | Pant et al. | |
| 6,018,735 A | 1/2000 | Hunter | |
| 6,025,843 A | 2/2000 | Sklar | |
| 6,026,388 A | 2/2000 | Liddy et al. | |
| 6,032,111 A | 2/2000 | Mohri at al. | |
| 6,055,528 A | 4/2000 | Evans | |
| 6,058,365 A | 5/2000 | Nagai et al. | |
| 6,064,953 A | 5/2000 | Maxwell, III et al. | |
| 6,070,158 A | 5/2000 | Kirsch et al. | |
| 6,073,098 A | 6/2000 | Buchsbaum et al. | |
| 6,076,088 A | 6/2000 | Paik et al. | |
| 6,081,774 A | 6/2000 | de Hita et al. | |
| 6,094,652 A | 7/2000 | Faisal | |
| 6,101,537 A | 8/2000 | Edelstein et al. | |
| 6,138,128 A | 10/2000 | Perkowitz et al. | |
| 6,163,767 A | 12/2000 | Tang et al. | |
| 6,167,370 A | 12/2000 | Tsourikov et al. | |
| 6,169,986 B1 | 1/2001 | Bowman et al. | |
| 6,182,029 B1 | 1/2001 | Friedman | |
| 6,182,063 B1 | 1/2001 | Woods | |
| 6,182,065 B1 | 1/2001 | Yeomans | |
| 6,233,575 B1 | 5/2001 | Agrawal et al. | |
| 6,233,578 B1 | 5/2001 | Machihara et al. | |
| 6,243,679 B1 | 6/2001 | Mohri et al. | |
| 6,256,631 B1 | 7/2001 | Malcolm | |
| 6,263,335 B1 | 7/2001 | Paik et al. | |
| 6,269,368 B1 | 7/2001 | Diamond | |
| 6,271,840 B1 | 8/2001 | Finseth et al. | |
| 6,275,819 B1 | 8/2001 | Carter | |
| 6,278,973 B1 | 8/2001 | Chung et al. | |
| 6,292,794 B1 | 9/2001 | Cecchini et al. | |
| 6,292,938 B1 | 9/2001 | Sarkar et al. | |
| 6,304,864 B1 | 10/2001 | Liddy et al. | |
| 6,304,872 B1 | 10/2001 | Chao | |
| 6,311,194 B1 | 10/2001 | Sheth et al. | |
| 6,314,439 B1 | 11/2001 | Bates et al. | |
| 6,324,534 B1 | 11/2001 | Neal et al. | |
| 6,349,295 B1 | 2/2002 | Tedesco et al. | |
| 6,353,827 B1 | 3/2002 | Davies et al. | |
| 6,363,377 B1 | 3/2002 | Kravets et al. | |
| 6,366,910 B1 | 4/2002 | Rajaraman et al. | |
| 6,377,945 B1 | 4/2002 | Risvik | |
| 6,393,415 B1 | 5/2002 | Getchius et al. | |
| 6,397,209 B1 | 5/2002 | Reed et al. | |
| 6,397,212 B1 | 5/2002 | Biffar | |
| 6,401,084 B1 | 6/2002 | Ortega et al. | |
| 6,415,250 B1 | 7/2002 | van den Akker | |
| 6,421,675 B1 | 7/2002 | Ryan et al. | |
| 6,434,556 B1 | 8/2002 | Levin et al. | |
| 6,438,540 B1 | 8/2002 | Nasr et al. | |
| 6,438,575 B1 * | 8/2002 | Khan et al. | 709/200 |
| 6,449,589 B1 | 9/2002 | Moore | |
| 6,505,158 B1 * | 1/2003 | Conkie | 704/260 |
| 6,560,590 B1 | 5/2003 | Shwe et al. | |
| 6,584,464 B1 | 6/2003 | Warthen | |
| 6,601,026 B1 * | 7/2003 | Appelt et al. | 704/9 |
| 6,651,220 B1 | 11/2003 | Penteroudakis et al. | |

OTHER PUBLICATIONS

Khan I et al., "Personal Adaptive Web Agent: A Tool for Information Filtering", Canadian Conference on Electrical and Computer Engineering, vol. 1, May 25, 1997, pp. 305-308.

Davies J et al., "Knowledge Discovery and Delivery", British Telecommunications Engineering, London, GB, vol. 17, No. 1, Apr. 1, 1998, pp. 25-35.

Persin M, "Document Filtering for Fast Ranking", Sigir 94. Dublin, Jul. 3-6, 1994. Proceedings of the Annual International ACM-Sigir Conference on Research and Development in Information Retrieval, Berlin, Springer, DE, vol. CONF. 17, Jul. 3, 1994, pp. 339-348.

Han et al., "WebACE: A Web Agent for Document Categorization and Exploration", Proceedings of the 2nd International Conference on Autonomous Agents Minneapolis/St. Paul, MN, May 9-13, 1998, Proceedings of the International Conference on Autonomous Agents, New York, NY, May 9, 1998, pp. 408-415.

Hideo Shimazu et al., "CAPIT: Natural Language Interface Design Tool With Keyword Analyzer and Case-Based Parser", NEC Research and Development, Nippon Electric Ltd., Tokyo, JP, vol. 33, No. 4, Oct. 1, 1992, pp. 679-688.

* cited by examiner

WIRELESS INFORMATION RETRIEVAL

BACKGROUND

This invention relates to wireless information retrieval.

A search engine is a software program used for search and retrieval in database systems. The search engine often determines the searching capabilities available to a user. A web search engine is often an interactive tool to help people locate information available over the so-called World Wide Web (WWW). Web search engines are actually databases that contain references to thousands of resources. There are many search engines available on the web, from companies such as Alta Vista, Yahoo, Northern Light and Lycos.

The searching capabilities are also dependent upon the type of input/output device available to the user. For example, coupling search engines to handheld wireless input/output devices introduces an array of challenges due to, for example, small output display screens, cumbersome input methods prone to generating input errors, limited bandwidth connections, and so forth.

SUMMARY

In an aspect, the invention features a method of accessing information including processing a query and a wireless identifier received from a wireless device, searching a collection of data for a set of results matching the query, selectively reducing the set of results to generate a subset of results, outputting a prose rendition of the query and outputting the subset of results on the wireless device.

The invention may include one or more of the following features. Processing the query includes parsing the query to generate a search fragment, substituting long form words for abbreviations contained in the search fragment in conjunction with an abbreviations dictionary and adding context to the search fragment. Adding context may include extracting data from a web page from which the query was received. Adding context may include extracting data from a previously presented results page from which the query was received. Processing the query may include normalizing text of the query, parsing the text, associating long form words for abbreviations in conjunction with an abbreviations dictionary and providing meaning to the text. Processing the query may further include associating context with the text. Selectively reducing may include placing the set of results in a hierarchical data structure organized by taxonomy and discarding results positioned at a lowest level of the hierarchical data structure. Outputting the prose rendition may include processing the query in conjunction with rules of grammar and processing the query in conjunction with a prose configuration file. Outputting of the subset includes placing the subset in a table and the table may be customized to the query. Customizing the table to the query may include loading a wireless style sheet database, locating a style sheet that matches the wireless identifier in the style sheet database and reducing the length and width of the table in accordance with the style sheet. Reducing may further include dividing the table into a number of smaller tables. Customizing the table may include loading an abbreviations dictionary and replacing long form words in the table with corresponding abbreviations in the abbreviations database.

In another aspect, the invention features a method of accessing information from a wireless device including processing a query and a wireless identifier received from the wireless device, searching a collection of data for a set of results matching the query, selectively reducing the set of results to generate a subset of results and outputting the subset of results on the wireless device according to a style sheet.

The invention may include one or more of the following features. The query may be any combination text, sentence fragments and abbreviated words, or merely text, sentence fragments or abbreviated words. The query may be speech. Processing the query includes parsing the query to generate a search fragment, substituting long form words for abbreviations contained in the search fragment in conjunction with an abbreviations dictionary and adding context to the search fragment. Adding context may include extracting data from a web page from which the query was received. Processing the query may include normalizing text of the query, parsing the text, associating long form words for abbreviations in conjunction with an abbreviations dictionary and providing meaning to the text. Processing the query may further include associating context with the text. Selectively reducing can include placing the set of results in a hierarchical data structure organized by taxonomy and discarding results positioned at a lowest level of the hierarchical data structure. Outputting the subset may include placing the subset in a table, and reducing the length and width of the table in accordance with a style sheet and/or replacing long form words in the table with corresponding abbreviations in an abbreviations database may customize the table.

In another aspect, the invention features a computer program, residing on a computer-readable medium, including instructions for causing a computer to process a query and a wireless identifier received from a wireless device, search a collection of data for a set of results matching the query, selectively reduce the set of results to generate a subset of results, output a prose rendition of the query and output the subset of results on the wireless device.

In another aspect, the invention features a computer program, residing on a computer-readable medium, including instructions for causing a computer to process a query and a wireless identifier received from a wireless device, search a collection of data for a set of results matching the query, selectively reduce the set of results to generate a subset of results and output the subset of results on the wireless device according to a style sheet.

Embodiments of the invention may have one or more of the following advantages.

Input via a handheld wireless device into the informational retrieval process utilizes a spell checker, abbreviations dictionary and fragment interpretations to manipulate user queries Query results are summarized and outputted to accommodate a multitude of small screen sizes and shapes.

Verbal user queries are parsed and associated with "standard" transcriptions by utilizing grammar rule to generate supporting configuration files.

An information retrieval process takes a collection of documents on a main server collection of data containing words, generates an inverse index known as an IR index, and uses the IR index to produce answers to a user query. The process may then leverage grammar it develops for front end processing when building the IR index to generate phased synonyms (or phrased aliases) for the document. More specifically, the process may apply the parser and grammar rules to the document before the IR index is built.

Results returned to the user on the handheld wireless device are presented in such a fashion to accommodate small output screen displays. Results automatically incorporate characteristics specific to the handheld wireless device being used, such as available length and width of the display, generally referred to as "real estate."

Presenting summarized query results in a series of screen containing data optimizes available bandwidth.

The details of one or more embodiments of the invention are set forth in the accompanying drawings and the description below. Other features, objects, and advantages of the invention will be apparent from the description and drawings, and from the claims.

DESCRIPTION OF DRAWINGS

The foregoing features and other aspects of the invention will be described further in detail by the accompanying drawings, in which.

Like reference symbols in the various drawings indicate like elements.

DETAILED DESCRIPTION

Figure 1:
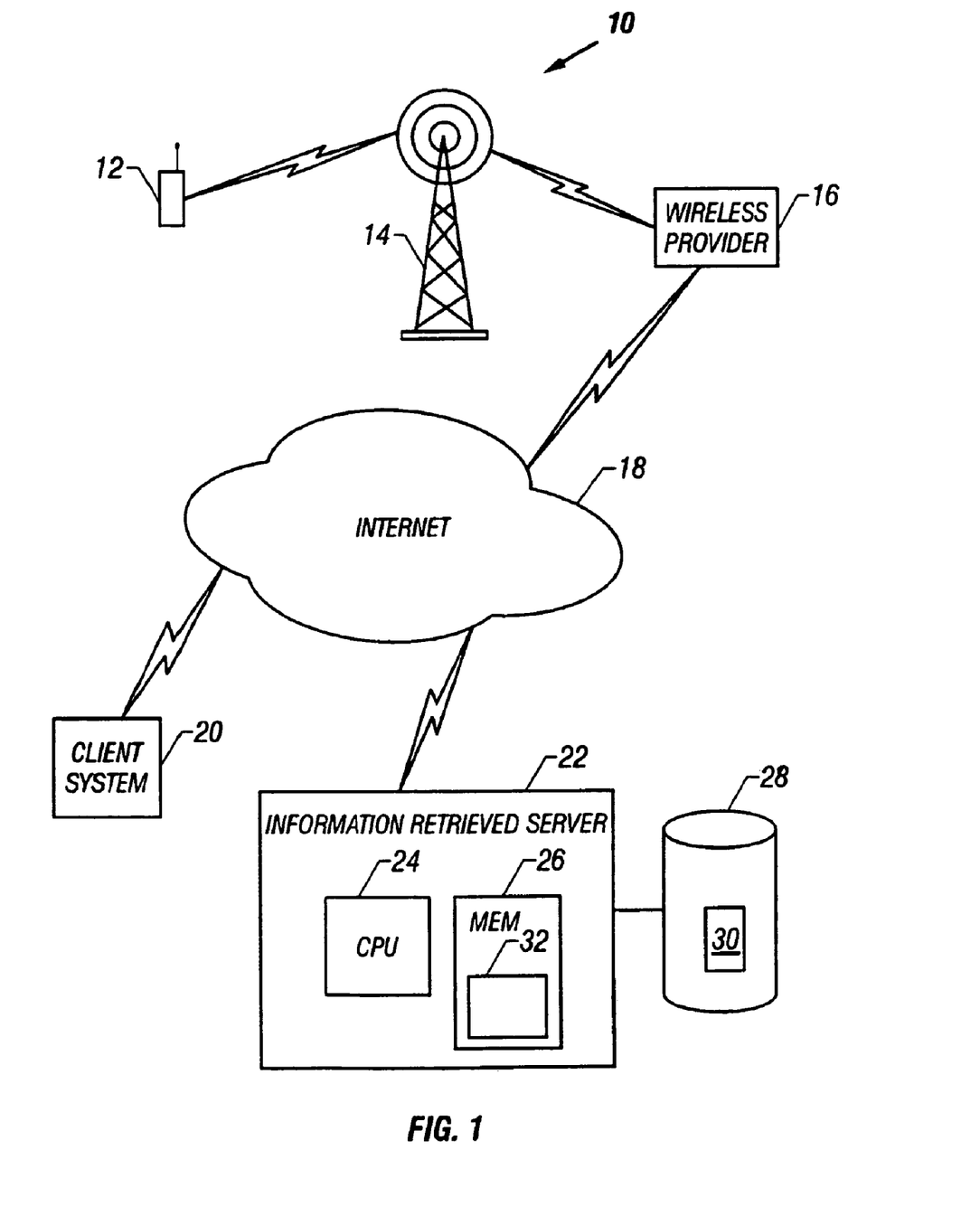
FIG. 1 is a block diagram of a wireless network configuration.

Referring to FIG. 1, a wireless network configuration 10 for executing an information access process includes a wireless device 12 having a wireless connection to a tower 14. The wireless device 12 may be a Windows CE device, a Palmos device, a two-way alpha-numeric pager, a pocket personal computer (PC), a personal data assistant (PDA), a cellular phone, a personal intelligent communicator (PIC) and so forth. The wireless device 12 is "web-enabled," i.e., the device 12 provides a user with access to the World Wide Web (WWW), a superset of the Internet 18, through a tower connection to a wireless provider 16. The network 10 also includes a client system 20 and an information retrieval server 22 linked to the Internet 18. The information retrieval server 22 includes at least a central processing unit (CPU) 24, a memory 26 and a storage device 28 containing one or more databases 30.

A user (not shown) wishing to conduct a search or query does so by entering text or speech search (or query) terms through the wireless device 12. Various methods of search input may be utilized, such as stylus, buttons, audio, and so forth. The search or query terms are transmitted from the wireless device 12 along with a wireless device identifier (WDI) through the tower 14 and wireless provider 16 to access the Internet 18 and thus the information retrieval server 22. The wireless device 14 uses any suitable web-browser, micro-browser, or mobile browser, such as Openwave® mobile browser, go.web browser, Netscape Navigator®, Internet Explorer®, Opera®, and so forth. The WDI is "hard-coded" is contained in the wireless device during its manufacture and is used by the information retrieval server 22 to define characteristics of the wireless device, such as make, model, screen dimensions, and so forth. An information access process 32 residing in the memory 26 of the information retrieval server 22 receives the query and the WDI.

Figure 2:
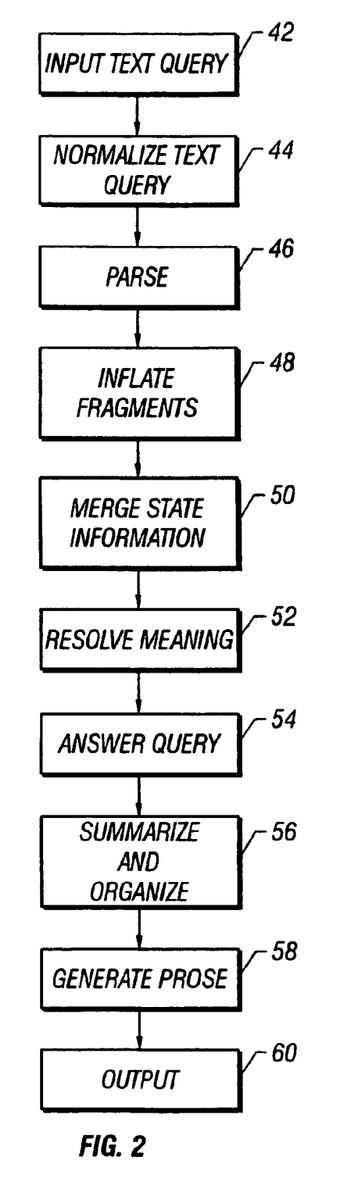
FIG. 2 is a flow diagram of an information access process.

Referring to FIG. 2, the information access process 32 includes receiving 42 the query by a user. The query may be a word or multiple words, abbreviated words, sentence fragments, a complete sentence, and may contain punctuation. The query is normalized 44 as pretext. Normalization includes checking the text for spelling, proper separation, and passing the text through an abbreviations dictionary that resolves abbreviations contained within the query. The abbreviations dictionary is one of the databases 30 contained in the storage device 28 of the information retrieval server 22. The abbreviations dictionary is a list of words and phrases and their corresponding shortened forms. The information access process 32 supports abbreviations through the abbreviations dictionary so as to aid the user in entering their query through the wireless device 12. As discussed above, wireless devices in general are not adapted to accept rapid and robust input, but rather, are limited and cumbersome to use because of their small sizes. Further, many wireless devices utilize a stylus or small number pad or keyboard to input text. The use of abbreviations during query input is promoted and facilitated by comparing inputted abbreviations with their corresponding long forms in the abbreviations dictionary.

A language lexicon is also consulted during normalization. The language lexicon specifies a large list of words along with their normalized forms. The normalized forms typically include word stems only, that is, the suffixes are removed from the words. For example, the word "computers" would have the normalized form "computer" with the plural suffix removed.

The normalized text is parsed 46, converting the normalized text into fragments adapted for further processing. Annotating words as punitive keys and values, according to a feature lexicon, produces fragments. The feature lexicon is a vocabulary, or book containing an alphabetical arrangement of the words in a language or of a considerable number of them, with the definition of each, a dictionary. For example, the feature lexicon may specify that the term "Compaq" is a potential value and that "CPU speed" is a potential key. Multiple annotations are possible.

The fragments are inflated 48 by the context in which the text inputted by the user arrived, e.g., a previous query, if any, that was inputted and/or a content of a web page in which the user text was entered. The inflation is preformed by selectively merging 50 state information provided by a session service with a meaning representation for the current query. The selective merging is configurable based on rules that specify which pieces of state information from the session service should be merged into the current meaning representation and which pieces should be overridden or masked by the current meaning representation.

The session service stores all of the "conversations" that occur at any given moment during all of the user's session. State information is stored in the session service providing a method of balancing load with additional computer configurations. Load balancing may send each user query to a different configuration of the computer system. However, since query processing requires state information, storage of station information on the computer system will not be compatible with load balancing. Hence, use of the session service provides easy expansion by the addition of computer systems, with load sharing among the systems to support more users.

The state information includes user specified constraints that were used in a previous query, along with a list of features displayed by the process 32 and the web page presented by the main server. The state information may optionally include a result set, either in its entirety or in condensed form, from the previous query to speed up subsequent processing in context. The session service may reside in one computer system, or include multiple computer systems. When multiple computer systems are employed, the state information may be assigned to a single computer system or replicated across more than one computer system.

Figure 3:
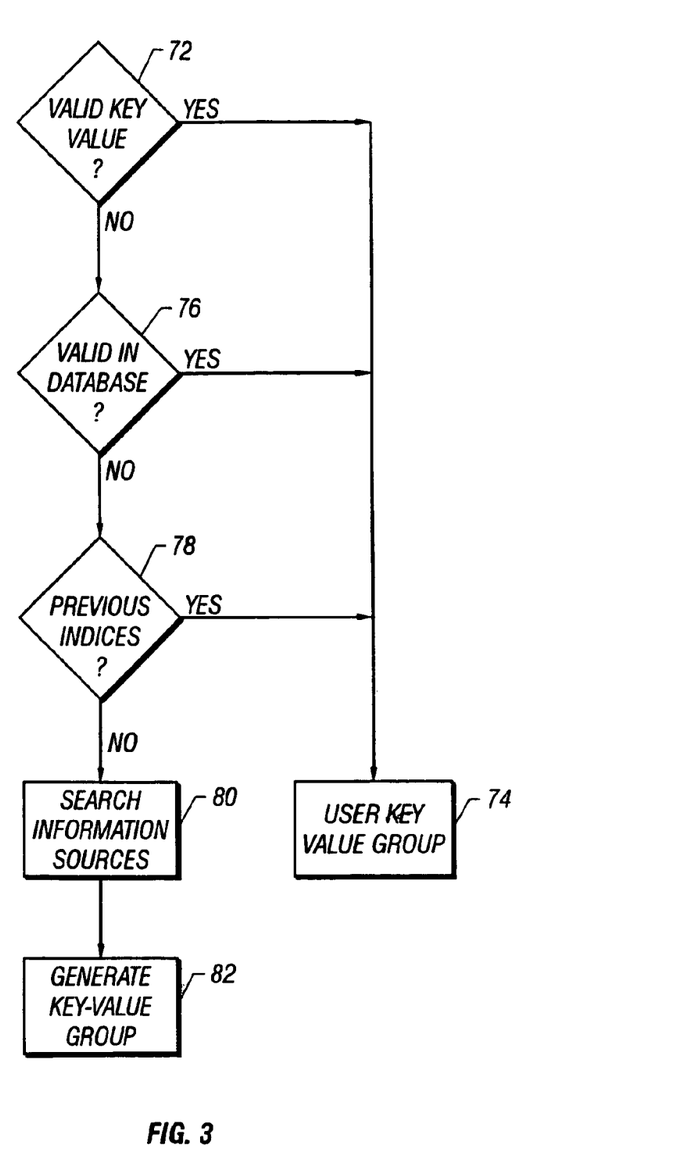
FIG. 3 is a flow diagram of a meaning resolution process used by the information access process of FIG. 2.

The inflated sentence fragments are converted 52 into meaning representation by making multiple passes through a meaning resolution process 70. Referring to FIG. 3, the meaning resolution process 70 determines 72 if there is a valid interpretation within the text query of a key-value grouping of the fragment. If there is a valid interpretation, the key value grouping is used 74. For example, if the input text, i.e., inflated sentence fragment, contains the string "500 MHz CPU speed," which may be parsed into two fragments, "500 MHz" value and "CPU speed" key, then there is a valid grouping of key="CPU speed" and value="500 MHz".

If no valid interpretation exists, a determination 76 is made on whether the main database contains a valid interpretation. If there is a valid interpretation in the main database, the key value group is used 74. If no valid interpretation is found in the main database, the process 70 determines 78 whether previous index fields have a high confidence of uniquely containing the fragment. If so, the key value grouping is used 74. If not, other information sources are searched 80 and a valid key value group generated 82. If a high confidence and valid punitive key is determined through one of the information sources consulted, then the grouping of the key and value form an atomic element are used 74. To make it possible to override false interpretations, a configuration of grammar can also specify manual groupings of keys and values that take precedence over the meaning resolution process 70.

Referring again to FIG. 2, meaning resolved fragments, representing the user query, are answered 54. In providing an answer or answers, logic may decide whether or not to go out to the main database, whether or not to do a simple key word search, or whether or not to do direct navigation, and so forth. Answer or answers are summarized and organized 56. Summarization and organization may involve intelligent discarding of excessive and unneeded details to provide more meaningful results in response to the user query.

When a user asks a question, i.e., submits a query, there is usually no way to predict how many appropriate results will be found. The process 32 attempts to present the user with no more information than can be reasonably absorbed and is dictated by the amount of space available on the user's wireless display.

Prose is generated 58. The prose represents the specific query the user initially asked, followed by organized and summarized results to the user query. The prose and organized answers are formatted for the wireless device and outputted 60 to the user for display. Output to the user may involve producing HTML of the prose and organized answers and/or XML for transmission of the organized answers and dynamic prose back to the main server for rendering into HTML, WML, HDML and other markup languages for display on the wireless device. XML refers to extensive markup language, a flexible way to provide common information formats and share both the format and the data on the World Wide Web, intranets, and elsewhere. Formatting for a wireless device may include a combination of the following: applying a style sheet, reducing the width and height of tables through use o abbreviations in the lexicon, or, breaking a large table into multiple smaller tables. Any individual or group of individuals or companies that wants to share information in a consistent way can use XML.

Figure 4:
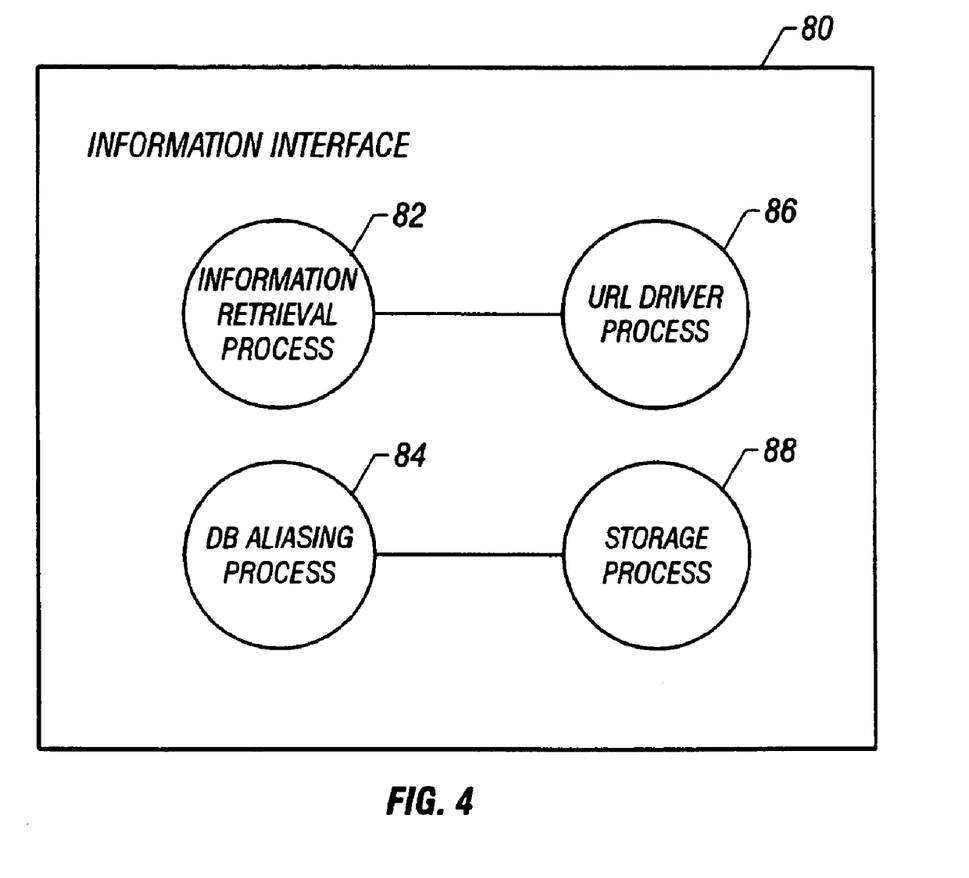
FIG. 4 is a block diagram of an information interface.

Referring to FIG. 4, control logic of process 32 includes an information interface 80. The purpose of the information interface 80 is to isolate the control logic from the details of any given web site on the main server or other servers, e.g., how they store particular information. For example, different web sites will name things differently and/or store things differently. The information interface 80 provides a standard format for both receiving information from, and sending information to, the control logic of process 32, and normalizes the interface to various information sources. The information interface 80 includes an information retrieval process 82, a database (db) aliasing process 84, a URL driver process 86 and a storage process 88.

An exemplary illustration of a standard format used by the information interface 80 is shown as follows:

```
{_
    :features {features
              :_ {feature
              :key 'product price'}
              :_ {feature
              :key 'product min age'}
              :_ {feature
              :key 'product max age'}
              :_{feature
              :key 'product name'}
              :_ {feature
              :key 'sku'}}
    :constraints {or
              :_ {and
              :_ {feature
              :key 'product description'
              :value {or
                      :_ {value
                          :eq
      'fire trucks'                                          :kwid
      'fire trucks'}}}}}
              :sort {features
              :_ {feature
              :key 'product price'}
              :_ {feature
              :key 'product min age'}
              :_ {feature
              :key 'product max age'}
              :_ {feature
              :key 'product name'}
              :_ {feature
              :key 'sku'}}}
```

The information interface 80 handles and formats both "hard" and "soft" searches. A hard search typically involves a very specific query for information, while a soft search typically involves a very general query for information. For example, a hard search may be for the price to be less than $500 where price is a known column in the database and contains numeric values. The IR engine to include occurrences of "fire truck" within textual descriptions may interpret a soft search for "fire engine".

The URL driver process 86 maintains a URL configuration file. The URL configuration file stores details of a web site in compressed format. The compression collapses a set of web pages with the same basic template into one entry in the URL configuration file. By way of example, the following is a sample portion of a URL configuration file entry:

```
        /newcar/$Manufacturer/$Year/$Model/
            keys: overview
        /newcar/$Manufacturer/$Year/$Model/safetyandreliability.
asp
            keys: safety reliability
```

The db aliasing process 84 handles multiple words that refer to the same information. For example, the db aliasing process 84 will equate "laptop" and "notebook" computers and "pc" and "personal computer."

The URL driver process 86 includes bi-directional search logic for interacting with the URL configuration file. In a "forward" search direction, a specific query is received and the search logic searches the URL configuration file for a best match or matches and assigns a score to the match or matches, the score representing a relative degree of success in the match. The score is determined by the number of keys in the URL configuration entry that match the keys desired by the current meaning representation of the query. More matching keys will result in a higher score.

In a "reverse" direction, the search logic contained within the URL driver process 86 responds to a query by looking at the contents of the web page in which the user is currently viewing and finds the answer to the new user query in combination with the features of the web page which the user is viewing, along with a score of the match or matches. Thus, the search logic of the URL driver process 86 looks at the current web page and connects current web page content with current user queries, thus deriving contacts from the previous line of questioning.

As described with reference to FIG. 2, the information access process 32 contains control logic to provide answers to a user's query. The answers are summarized and organized, taking into consideration the specific wireless device being utilized. Typically, the results of a specific database search, i.e., user query, will identify many rows of results. These rows will often result in more than one web page of displayed results if the total result is taken into account. The information access process 32 reduces the number of rows of answers in an iterative fashion in conjunction with a WID that characterizes the screen size of the wireless device.

Figures 5, 6:
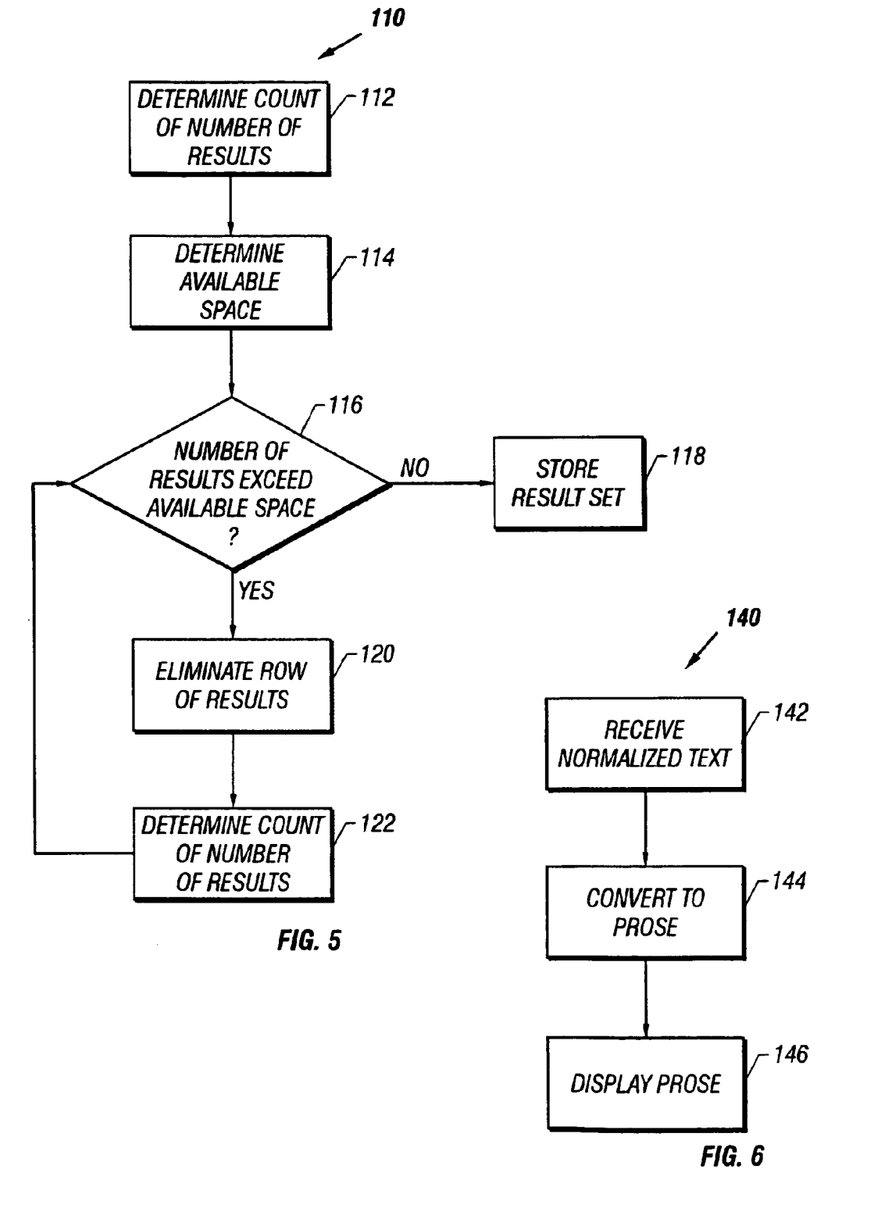
FIG. 5 is a flow diagram of a reduction and summarization process used by the information access process of FIG. 2.
FIG. 6 is a flow diagram of a prose process used by the information access process of FIG. 2.

Referring to FIG. 5, a reduction and summarization process 110 determines 112 a count of the total number of results obtained from searching the main database. The reduction and summarization process 110 determines 114 the amount of available space on the wireless web page for display of the answers on specific wireless devices using the WID. A database of WIDs and corresponding style sheets is stored and maintained in the storage device 28. The process 110 searches the WID database for the received WID and uses the WID's corresponding style sheet in preparing the results for display to the user. Style sheets represent the total amount of "real estate" available for display on the wireless device, i.e., the total number of rows and columns on the device, as well as the default font size of the device. A determination 116 is made as to whether the number of results exceeds the available space on the wireless web page. If the number of results does not exceed the available space on the web page the results are displayed 118 on the web page. If the number of results exceeds available space on the web page, a row of results is eliminated 120 to produce a subset of the overall results. The number of results contained within the subset is determined 122. The determination 116 of whether the number of results contained within the subset exceeds available space on the wireless web page is executed. The reduction and summarization process 110 continues until the number of results does not exceed available display space on the wireless web page.

When a reduction of results is made, the reduction and summarization process 110 has no prior knowledge of how it will affect the total count, i.e., how many rows of data will be eliminated. However, the process 110 does have knowledge gained from the corresponding style sheet of the wireless device that provides the total number of rows and columns available for display. Reductions may reduce the overall result count, i.e., rows of result data, in different ways. Before any reduction and summarization is displayed in tabular form to the user, the resultant data is placed in a hierarchical tree structure based on its taxonomy. Some searches will generate balanced trees, while others will generate unbalanced trees. Further, some trees will need to be combined with other trees. To reduce the resultant data, the reduction and summarization process 110 looks at the lowest members of the tree, i.e., the leaves, and first eliminates this resultant data. This results in eliminating one or more rows of data and the overall count of resultant data. If the overall count is still too large, the reduction and summarization process 110 repeats itself and eliminates another set of leaves.

Eliminating rows (i.e., leaves) to generate a reduced result set of answers allows the reduction and summarization process 110 to reduce identical information but maintain characterization under identical information in the hierarchical tree structure. The identical rows representing identical information can be collapsed. For example, if the eliminated row in the reduced result set contains specific price information, collapsing the eliminated row may generate price ranges instead of individual prices.

Additional reductions may be applied after the row elimination and summarization process through the substitution of abbreviations from the lexicon. If the resulting table is still too large to display, the resulting table may also be subdivided into multiple smaller tables.

As mentioned previously, some results may generate multiple trees. In a particular embodiment, to reduce the overall amount of resultant data in the result set, information is eliminated where the greatest number of leaves is present across multiple trees.

Referring again to FIG. 2, it should be noted that sometimes the information access process 32 will provide no summarization and/or reduction of results, e.g., the user asks for no summarization or the results are very small. Results are then presented to fit the style sheet of the wireless device with no summarization.

Organization of resultant data generally puts the answers to the user's query into a hierarchy, like a table, for example, and the table may include links to other web pages for display to the user. Links, i.e., addresses associated with each row of the displayed results, are encoded within each element of the hierarchical tree structure so that the user may navigate to a specific web page by clicking on any of the links of the resultant rows of displayed data. The encoding is done by including a reference to a specific session know by the session service along with the address to an element in the table of results displayed during the specific session. State information provided by the session service can uniquely regenerate the table of results. The address is a specification of the headings in the table of results.

For example, if an element in the hierarchical structure is under a subheading "3" which is under a major heading "E" the address would specify that the major heading is "E" and that the subheading is "3." Response planning may also include navigation to a web page in which the user will find a suitable answer to their query.

As previously described, prose is generated and added to the results.

Referring to FIG. 6, a prose process 140 includes receiving 142 the normalized text query. The normalized text query is converted 144 to prose and the prose displayed 146 to the user in conjunction with the results of the user query.

The prose process 140 receives the normalized text query as a text frame. The text frame is a recursive data structure containing one or more rows of information, each having a key that identifies the information. When the text frame is passed to the prose process 140 it is processed in conjunction with a prose configuration file. The prose configuration file contains a set of rules that are applied recursively to the text frame. These rules include grammar having variables contained within. The values of the variables come from the text frame, so when combined with the grammar, prose is generated. For example, one rule may be "there are $n products with $product." The variables $n and $product are assigned values from an analysis of the text frame. The text frame may indicate $n=30 and $product=leather. Thus, the prose that results in being displayed to the user is"there are 30 products with leather."

More than one rule in the prose configuration file may match the text frame. In such a case, prose process 140 will recursively build an appropriate prose output. In addition, if two rules in the prose configuration file match identically, the prose process 140 may arbitrarily select one of the two rules, but the database can be weighted to favor one rule over another. In some cases, default rules may apply. In addition, some applications may skip over keys and may use rules more than once.

The prose configuration file also contains standard functions, such as a function to capitalize all the letters in a title. Other functions contained within the prose configuration may pass arguments.

The information access process 32 (of FIG. 2) interfaces with a number of configuration files in addition to the prose configuration file. These configuration files aid the information access process 32 in processing queries with the most current data contained in the main server database. For example, the information access process 32 has a bootstrapping ability to manage changes to a web page of the main server and to the main server database. This bootstrapping ability is needed so that when the main server database changes occur, the information access process 32 utilizes the most current files.

The information access process 32 also includes a number of tools that analyze the main server database and build initial versions of all of the configuration files, like the prose configuration file; this is generally referred to as bootstrapping, as described above. Bootstrapping gives the information access process 32 "genuine" knowledge of how grammar rules for items searching looks like, specific to the main server database being analyzed.

Figure 7:
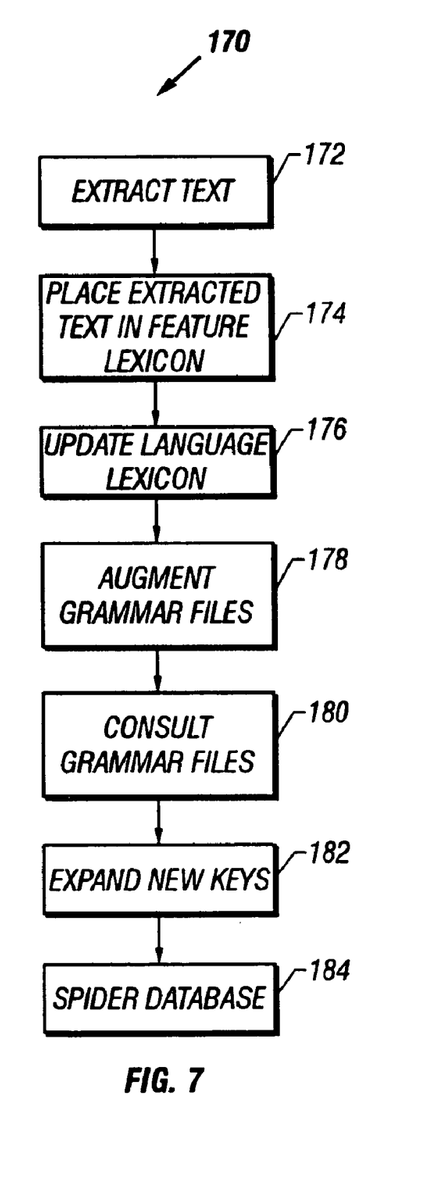
FIG. 7 is flow diagram of a bootstrap process used by the information access process of FIG. 2.

Referring to FIG. 7, a bootstrap process 170 extracts 172 all text corresponding to keys and values from the main server database. The extracted text is placed 174 into a feature lexicon. A language lexicon is updated 176 using a general stemming process. Grammar files are augmented 178 from the extracted keys and values. Generic grammar files and previously built application-specific grammar files are consulted 180 for rule patterns, that are expanded 182 with the newly extracted keys and values to comprise a full set of automatically generated grammar files.

For example, if an application-specific grammar file specifies that "Macintosh" and "Mac" parse to the same value, any extracted values containing "Macintosh" or "Mac" will be automatically convert into a rule containing both "Macintosh" and "Mac." The structuring of the set of grammar files into generic, application-specific and site-specific files allows for maximum automatic generation of new grammar files from the main server database. The bootstrapping process 170 can build the logic and prose configuration files provided that a system developer has inputted information about the hierarchy of products covered in the main server database.

The hierarchy for a books database, for example, may include a top-level division into "fiction" and "nonfiction." Within fiction, the various literary genres might form the next level or subdivision, and so forth. With knowledge of this hierarchy, the bootstrapping process 170 configures the logic files through link linguistic concepts relating to entries in the hierarchy with products in the main server database, so that the logic is configured to recognize, for example, that "fiction" refers to all fiction books in the books database. The logic configuration files are also automatically configured by default, and summarization and organization of the results uses all levels of the hierarchy. The prose configuration files are automatically generated with rules specifying that an output including, for example, mystery novels, should include the category term "mystery novels" from the hierarchy. The bootstrapping process 170 may also "spider" 184 a main server database so as to build a language lexicon of the site, e.g., words of interest at the site. This helps building robust configuration files. Spidering refers to the process of having a program automatically download one or more web pages, further downloading additional pages referenced in the first set of pages, and repeating this cycle until no further pages are referenced or until the control specification dictates that the further pages should now be downloaded. Once downloaded, further processing is typically performed on the pages. Specifically, the further processing here involves extracting terms appearing on the page to build a lexicon.

When the bootstrapping process 170 executes after original configuration files have been generated, the original configuration files are compared with the current configuration files and changes added incrementally as updates to the original configuration files.

Figure 8:
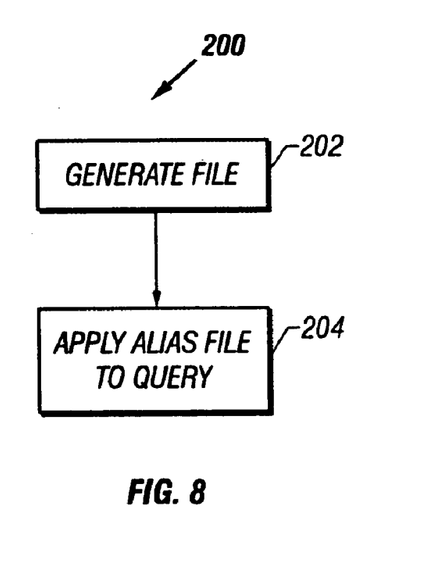
FIG. 8 is flow diagram of a database aliasing process used by the information access process of FIG. 2.

Referring again to FIG. 3, the information interface 80 includes the database aliasing process 88. The database aliasing process 88 provides a method to infer results when no direct match occurs. Referring to FIG. 8, a database (db) aliasing process 200 includes generating 202 and aliasing the file, and applying 204 the aliasing file to a user query. The automatic generation of the database aliasing file reduces the amount of initial development effort as well as the amount of ongoing maintenance when the main server database content changes.

Figure 9:
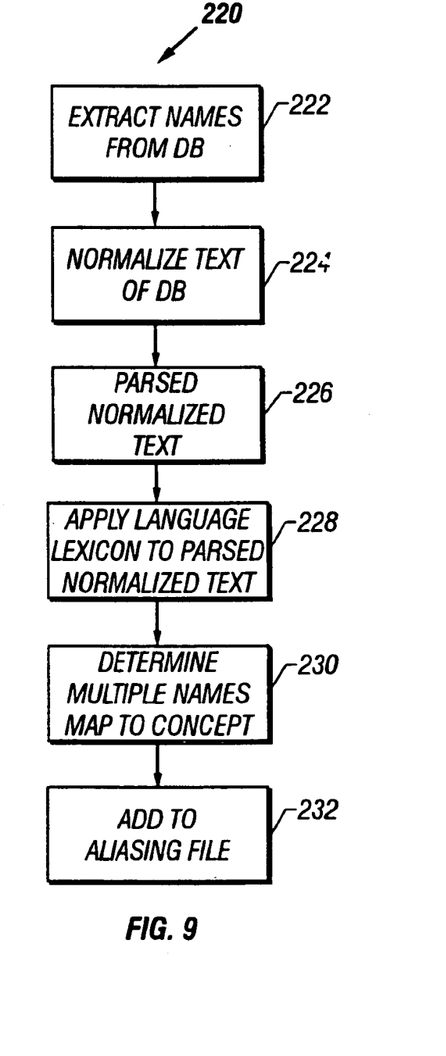
FIG. 9 is flow diagram of a database aliasing file generation process used by the information access process of FIG. 2.

Referring to FIG. 9, a database aliasing file generating process 220 includes extracting 222 names from the main server database. The extracted names are normalized 224. The normalized names are parsed 226. The language lexicon is applied 228 to the normalized parsed names. A determination 230 is made on whether multiple normalized names map to any single concept. If so, alias entries are stored 232 in the database aliasing file. In this manner, the grammar for the parser can be leveraged to produce the database aliasing file. This reduces the need for the system developer to input synonym information in multiple configuration files and also allows imprecise aliases, which are properly understood by the parser, to be discovered without any direct manual entry.

The db aliasing file, like many of the configuration files, is generated automatically, as described with reference to FIG. 9. It can also be manually updated when the context of the database under investigation changes. The database aliasing file is loaded and applied in such a way as to shield its operations from the information interface 80 of FIG. 3.

In a particular embodiment, the application of the db aliasing file to a query can be used in two directions. More specifically, in a forward direction, when a user query is received, applying the database aliasing file to the user query and resolving variations of spelling, capitalization, and abbreviations, normalized the user query, so that a normalize query can be used to search the main server database. In a reverse direction, if more than one alias is found, the search results will normalize on a single name for one item rather than all possible aliases found in the main server database file.

Referring again to FIG. 4, the information interface 80 includes the information retrieval (IR) process 82. The information retrieval process 82 purpose is to take a collection of documents on a main server database containing words, generate an inverse index known as an IR index, and use the IR index to produce answers to a user query. The information access process 32 (of FIG. 2) leverages grammar it develops for front end processing when building the IR index to generate phased synonyms (or phrased aliases) for the document. More specifically, the information access process 32 applies the parser and grammar rules to the document before the IR index is built. The effect of this can be described by way of example. One rule may indicate the entity "laptop" goes to "laptop" or "notebook." Thus, during parsing, if "notebook" is found, it will be replaced by the entity "laptop," which then gets rolled into the IR index.

At search time, the information access process 32 attempts to find documents containing the search terms of the user query, and in addition, the incoming user search terms are run through the parser, that will find multiple entities, if they exist, of the same term. Thus, combining the parser and the grammar rules, the information access process 32 maps a user query into its canonical form of referring to the item.

The information retrieval process 32 may also process a grammar and generate a grammar index, which can help find other phrased synonyms that other methods might not find. For example, "Xeon", an Intel Microprocessor whose full designation is the "Intel Pentium Xeon Processor," may be represented in canonical form as "Intel Xeon Processor." If a user query is received for "Intel," "Xeon" would not be found without the grammar index of the information access process 32. The information access process 32 will search the grammar index and produce a list of all grammar tokens containing "Intel," and add this list to the overall search so that the results would pick up "Xeon," among others.

The use of the parser and grammar rules to specify the expansion of a full user query to include synonyms allows for centralization of linguistic knowledge within the grammar rules, removing a need for additional manual configuration to gain the query expansion functionality.

Figure 10:
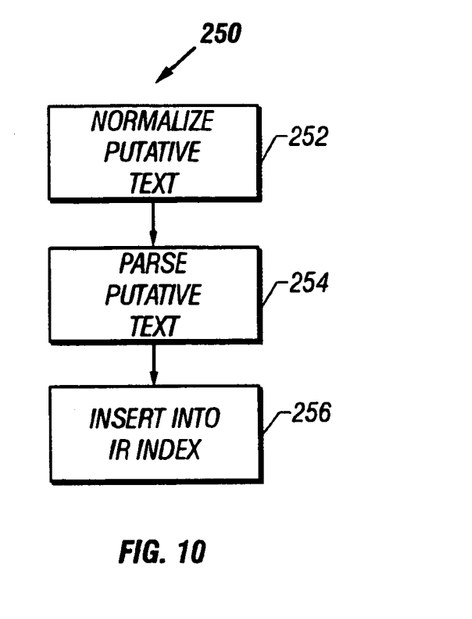
FIG. 10 is a flow diagram of a query expansion process used by the information access process of FIG. 2.

Referring to FIG. 10, a query expansion process 250 includes normalizing 252 and parsing 254 the punitive text. The canonical non-terminal representations are inserted 256 into an IR index in place of the actual punitive text.

In an embodiment, the punitive text is used "as-is." However, when a user requests a search, the punitive search phrase is processed according to the grammar rules to obtain a canonical non-terminal representation. The grammar rules are then used in a generative manner to determine which other possible phrases could have generated the same canonical non-terminal representation. Those phrases are stored in the IR index.

The "as-is" method described above is generally slower and less complete in query expansion coverage, because it may take too long to generate all possible phrases that reduce to the same canonical non-terminal representation, so a truncation of the possible phrase list can occur. However, the "as-is" method has the advantage of not requiring re-indexing the original text whenever the grammar rules are updated.

In a particular embodiment, the information access process 32 (of FIG. 2) combines an IR index search with a main server database search to respond to queries that involve a combination of structured features stored in a database (e.g., price, color) and unstructured information existing in free text. Structured Query Language (SQL) is used to interface to a standard relational database management system (RDBMS). To jointly search an RDBMS and an IR index, the information access process 32 issues an unstructured search request to the IR index, uses the results, and issues a SQL query that includes a restriction to those initial IR index search results. However, the free text information in the IR index may not always correspond to individual records in the RDBMS. In general, there may be many items in the IR index that correspond to categories of items in the RDBMS. In order to improve the efficiency of searches involving such items in the IR index, the IR index is further augmented with category hierarchy information. Thus, a match to an item in the IR index will also retrieve corresponding category hierarchy information, which can then be mapped to multiple items in the RDBMS.

The information access process 32 parser contains the capability of processing large and ambiguous grammar efficiently by using a graph rather than "pure" words. The parser allows the information access process 32 to take the grammar file and an incoming query and determine the query's structure. Generally, the parser pre-compiles the grammar into a binary format. The parser then accepts a query as input text, processes the query, and outputs a graph.

LR parsing is currently one of the most popular parsing techniques for context-free grammars. LR parsing is generally referred to as "bottom-up" because it tries to construct a parse tree for an input string beginning at the leaves (the bottom) and working towards the root (top). The LR parser scans the input string from left to right and constructs a right most derivation in reverse.

The information access process 32 improves on the LR parser by adding the ability to handle ambiguous grammars efficiently and by permitting the system developer to include regular expressions on the right hand side of grammar rules. In the "standard" LR parser, an ambiguous grammar would produce a conflict during the generation of LR tables. An ambiguous grammar is one that can interpret the same sequence of words as two or more different parse trees. Regular expressions are commonly used to represent patterns of alternative and/or optional words. For example, a regular expression "(a|b)c+" means one or more occurrences of the letter "c" following either the letter "a" or the letter "b."

In traditional LR parsing, a state machine, typically represented as a set of states along with transitions between the states, is used together with a last-in first-out (LIFO) stack. The state machine is deterministic, that is, the top symbol on the stack combined with the current state specifies conclusively what the next state should be. Ambiguity is not supported in traditional LR parsing because of the deterministic nature of the state machine.

To support ambiguity the information access process 32 extends the LR parser to permit non-determinism in the state machine, that is, in any given state with any given top stack symbol, more than one successor state is permitted. This non-determinism is supported in the information access process 32 with the use of a priority queue structure representing multiple states under consideration by the parser. A priority queue is a data structure that maintains a list of items sorted by a numeric score and permits efficient additions to and deletions from the queue. Because the parser used in the information access process 32 is permitted to be simultaneously in multiple states, the parser tracks multiple stacks, one associated with each current state. This may lead to inefficiency. However, since the multiple concurrent states tend to have a natural "tree" structure, because typically one state transitions to a new set of states through multiple putative transitions, the multiple stacks can be structured much more efficiently in memory usage via a similar tree organization.

In a traditional LR parser, the state diagram can be very large even for moderate size grammars because the size of the state diagram tends to grow exponentially with the size of the grammar. This results in tremendous memory usage because grammars suitable for natural language tend to be much larger than those for a machine programming language. In order to improve the efficiency of the state diagrams, the information access process 32 makes use of empty transitions that are known as "epsilon" transitions. The exponential increase in size occurs because multiple parses may lead to a common rule in the grammar, but in a deterministic state diagram, because the state representing the common rule needs to track which of numerous possible ancestors was used, there needs to be one state of each possible ancestor. However, because the information access process 32 has expanded the LR parser to support ambiguity via support for a non-deterministic state diagram, the multiple ancestors can be tracked via the previously described priority queue/stack tree mechanism. Thus, a common rule can be collapsed into a single state in the non-deterministic state diagram rather than replicated multiple times. In general, performing this compression in an optimal fashion is difficult. However, a large amount of compression can be achieved by inserting an epsilon whenever the right-hand side of a grammar rule recourses into a non-terminal. This has the effect of causing all occurrences of the same non-terminal in different right-hand-sides to be collapsed in the non-deterministic state diagram. A concern which the information access process 32 addresses is that any "left-recursion," that is, a rule which eventually leads to itself either directly or after the application of other rules, will result in a set of states in the non-deterministic state diagram that can be traversed in a circular manner via epsilon transitions. This would result in a potential infinite processing while parsing. In order to prevent infinite processing, if there are multiple possible epsilon transitions in series, they are reduced to a single epsilon transition. This may result in a small amount of inaccuracy in the parser, but avoids the potential for infinite processing.

The parser of the information access process 32 has also been expanded to support regular expressions on the right-hand-side of context-free grammar rules. Regular expressions can always be expressed as context-free rules, but it is tedious for grammar developers to perform this manual expansion, increasing the effort required to author a grammar and the chance for human error. Implementation of this extension would be to compile the regular expressions into context-free rules mechanically and integrate these rules into the larger set of grammar rules. Converting regular expressions into finite state automata through generally known techniques, and then letting a new non-terminal represent each state in the automata can accomplish this. However, this approach results in great inefficiency during parsing because of the large number of newly created states. Also, this expansion results in parse trees which no longer correspond to the original, unexpanded, grammar, hence, increasing the amount of effort required by the grammar developer to identify and correct errors during development.

An alternative used by the information access process 32 is to follow the finite state automaton corresponding to a regular expression during the parsing as if it were part of the overall non-deterministic state diagram. The difficulty that arises is that right-hand-sides of grammar rules may correspond to both regular expressions of terminal and non-terminal symbols in the same rule. Thus, when the LR parser of the information access process 32 reaches a reduce decision, there is no longer a good one-to-one correspondence between the stack symbols and the terminal symbols recently processed. A technique needs to be implemented in order to find the start of the right-hand side on the stack. However, because the parser uses epsilons to mark recursions to reduce the state diagram size, the epsilons also provide useful markers to indicate on the stack when non-terminals were pursued. With this information, the LR parser of the information access process 32 is able to match the stack symbols to the terminals in the input text being parsed.

Another efficiency of the LR parser of the information access process 32 involves the ability to support "hints" in the grammar. Because natural language grammars tend to have a large amount of ambiguity, and ambiguity tends to result in much lengthier parsing times. In order to keep the amount of parsing time manageable, steps must be taken to "prune" less promising putative parses. However, automatic scoring of parses for their "promise" is non-trivial. There exist probabilistic techniques, which require training data to learn probabilities typically associated with each grammar rule. The LR parser of the information access process 32 uses a technique that does not require any training data. A grammar developer is allowed to insert "hints," which are either markers in the grammar rules with associated "penalty costs" or "anchors." The penalty costs permit the grammar developer to instruct the LR parser of the information access process 32 to favor certain parses over others, allowing for pruning of less-favored parses. Anchors indicate to the LR parser that all other putative parses that have not reached an anchor should be eliminated. Anchors thus permit the grammar developer to specify that a given phrase has a strong likelihood of being the correct parse (or interpretation), hence, all other parses are discarded.

Another concern with supporting ambiguous grammars is that the large number of parses consumes much memory to represent. The LR parser of the information access process 32 is modified to represent a list of alternative parse trees in a graph structure. In the graph representation, two or more parse trees that share common substructure within the parse tree are represented as a single structure within the graph. The edges in the graph representation correspond to grammar rules. A given path through the graph represents a sequential application of a series of grammar rules, hence, uniquely identifying a parse tree.

Once a graph representation of potential parses is generated, at the end of parsing a frame representation of the relevant potential parses is outputted. This is achieved via a two-step method. First, the graph is converted into a series of output directives. The output directives are specified within the grammar by the grammar developer. Second, frame generation occurs as instructed by the output directives. The first step is complicated by the support for regular expressions within the grammar rules because a node in the parse tree may correspond to the application of a regular expression consisting of non-terminals, which in turn corresponds to application of other grammar rules with associated output directives. The identity of these non-terminals is not explicitly stated in the parse tree. In order to discover these identities, during the first step, the process follows a procedure very similar to the previously described LR parser, but instead, because one already has a parse tree, the parse tree is used to "guide" the search control strategy. Once the proper identities are discovered, the corresponding output directives are sent to the second stage.

The information interface 80 frequently needs to access multiple tables in an RDBMS in order to fulfill a data request made by the control logic of the information access process 32. It is unwieldy for the system developer to specify rules on which tables need to be accessed to retrieve the requested information. Instead, it is much simpler for the system developer to simply specify what information is available in which tables. Given this information, the information interface 80 finds the appropriate set of tables to access, and correlates information among the tables. The information interface 80 (of FIG. 4) requests a standard join operation in SQL to carry out the correlation.

In order to properly identify a set of tables and their respective join columns, the information interface 80 (of FIG. 4) views the set of tables as nodes in a graph and the potential join columns as edges in a graph. Given this view, a standard minimum spanning tree (MST) algorithm may be applied. However, the input to the information interface 80 is a request based on features and not on tables. In order to identify the tables and join columns, the information interface 80 treats the set of tables as nodes in a graph and the set of join columns as edges in the graph. A standard minimum spanning tree (MST) algorithm can be applied. One problem is that the same feature may be represented in more than one table. Thus, there may be multiple sets of tables that can potentially provide the information requested. In order to identify the optimal set of tables and join columns, the information interface 80 must apply a MST algorithm to each possible set of tables. Because the number of possible sets can expand exponentially, this can be a very time consuming process. The information interface 80 also has the ability to make an approximation as follows. There is a subset, which may be zero, one, or more, of features, which are represented in only one table per feature. These tables therefore are a mandatory subset of the set of tables to be accessed. In the approximation, the information interface 80 first applies a MST algorithm to the mandatory subset, and then expands the core subset so as to include all the requested tables. The expansion seeks to minimize the number of additional joins needed to cover each feature not covered by the mandatory subset.

Other embodiments are within the following claims.

What is claimed is:

1. A computer-implemented method of accessing information comprising:

processing query text and a wireless identifier received from a wireless device, the processing comprising:
parsing the query text to generate a search fragment;
substituting long form words for abbreviations contained in the search fragment in conjunction with an abbreviations dictionary; and
adding context to the search fragment;
searching a collection of data for a set of results matching the query text;
selectively reducing, in conjunction with viewing space on the wireless device, the set of results to generate a subset of results;
outputting a prose rendition of the query text; and
outputting the subset of results on the wireless device.

2. The computer-implemented method of claim 1 wherein adding context comprises extracting data from a web page from which the query text was received.

3. The computer-implemented method of claim 1 wherein adding context comprises extracting data from a previously presented results page from which the query text was received.

4. The computer-implemented method of claim 1 wherein selectively reducing comprises:
placing the set of results in a hierarchical data structure organized by taxonomy; and
discarding results positioned at a lowest level of the hierarchical data structure.

5. The computer-implemented method of claim 1 wherein outputting the prose rendition comprises:
processing the query text in conjunction with rules of grammar; and
processing the query text in conjunction with a prose configuration file.

6. The computer-implemented method of claim 1 wherein outputting of the subset comprises placing the subset in a table.

7. The computer-implemented method of claim 6 further comprising customizing the table to the wireless device.

8. The computer-implemented method of claim 7 wherein customizing the table to the wireless device comprises:
loading a wireless style sheet database;
locating a style sheet that matches the wireless identifier in the style sheet database; and
reducing the length and width of the table in accordance with the style sheet.

9. The computer-implemented method of claim 8 wherein reducing further comprises subdividing the table into a plurality of smaller tables.

10. The computer-implemented method of claim 7 wherein customizing the table comprises:
loading an abbreviations dictionary; and
replacing long form words in the table with corresponding abbreviations in the abbreviations database.

11. A computer-implemented method of accessing information from a wireless device comprising:
processing query text and a wireless identifier received from the wireless device, the processing comprising:
parsing the query text to generate a search fragment;
substituting long form words for abbreviations contained in the search fragment in conjunction with an abbreviations dictionary; and
adding context to the search fragment;
searching a collection of data for a set of results matching the query text;
selectively reducing, in conjunction with viewing space on the wireless device, the set of results to generate a subset of results;

outputting a prose rendition of the query text; and outputting the subset of results on the wireless device according to a style sheet.

12. The computer-implemented method of claim 11 wherein the query text is a combination of text, sentence fragments and abbreviated words.

13. The computer-implemented method of claim 11 wherein the query text is sentence fragments.

14. The computer-implemented method of claim 11 wherein the query text is abbreviated words.

15. The computer-implemented method of claim 11 wherein the query text is speech.

16. The computer-implemented method of claim 11 wherein adding context comprises extracting data from a web page from which the query text was received.

17. The computer-implement method of claim 11 wherein adding context comprises extracting data from a previously presented results page from which the query text was received.

18. The computer-implemented method of claim 11 wherein selectively reducing comprises:

placing the set of results in a hierarchical data structure organized by taxonomy; and discarding results positioned at a lowest level of the hierarchical data structure.

19. The computer-implemented method of claim 11 wherein outputting the subset comprises:

placing the subset in a table; and reducing the length and width of the table in accordance with a style sheet.

20. The computer-implemented method of claim 19 wherein reducing further comprises dividing the table into a plurality of smaller tables.

21. The computer-implemented method of claim 11 wherein outputting the subset comprises replacing long form words in the table with corresponding abbreviations in an abbreviations database.

22. A computer program, residing on a computer-readable medium, including instructions for causing a computer to:

process query text and a wireless identifier received from a wireless device, the processing comprising:

parsing the query text to generate a search fragment;

substituting long form words for abbreviations contained in the search fragment in conjunction with an abbreviations dictionary; and adding context to the search fragment;

search a collection of data for a set of results matching the query text;

selectively reduce, in conjunction with viewing space on the wireless device, the set of results to generate a subset of results;

output a prose rendition of the query text; and output the subset of results on the wireless device.

23. A computer program, residing on a computer-readable medium, including instructions for causing a computer to:

process query text and a wireless identifier received from a wireless device, the processing comprising:

parsing the query text to generate a search fragment;

substituting long form words for abbreviations contained in the search fragment in conjunction with an abbreviations dictionary; and adding context to the search fragment;

search a collection of data for a set of results matching the query text;

selectively reduce, in conjunction with viewing space on the wireless device, the set of results to generate a subset of results;

outputting a prose rendition of the query; and output the subset of results on the wireless device according to a style sheet.

* * * * *

UNITED STATES PATENT AND TRADEMARK OFFICE
CERTIFICATE OF CORRECTION

PATENT NO. : 7,136,846 B2  Page 1 of 1
APPLICATION NO. : 09/827500
DATED : November 14, 2006
INVENTOR(S) : Chang et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (506) days Delete the phrase "by 506" and insert -- by 521 -- days Signed and Sealed this Thirtieth Day of September, 2008

JON W. DUDAS
*Director of the United States Patent and Trademark Office*